(12) United States Patent
Fader et al.

(10) Patent No.: US 10,311,241 B2
(45) Date of Patent: Jun. 4, 2019

(54) MEMORY MANAGEMENT

(71) Applicant: NXP USA, Inc., Austin, TX (US)

(72) Inventors: Joachim Fader, Munich (DE); Robert Krutsch, Munich (DE); Dirk Wendel, Munich (DE)

(73) Assignee: NXP USA, Inc., Austin, TX (US)

( * ) Notice: Subject to any disclaimer, the term of this patent is extended or adjusted under 35 U.S.C. 154(b) by 158 days.

(21) Appl. No.: 15/701,517

(22) Filed: Sep. 12, 2017

(65) Prior Publication Data

US 2018/0157848 A1    Jun. 7, 2018

(30) Foreign Application Priority Data

Dec. 6, 2016   (EP) ..................................... 16202371

(51) Int. Cl.
*G06F 11/30*    (2006.01)
*G06F 21/60*    (2013.01)
(Continued)

(52) U.S. Cl.
CPC ........ *G06F 21/602* (2013.01); *G06F 11/0727* (2013.01); *G06F 11/0751* (2013.01);
(Continued)

(58) Field of Classification Search
CPC .... G06F 21/602; G06F 11/08; G06F 11/0751; G06F 11/0727; G06F 11/1048; G06F 11/1052; G06F 13/1668
(Continued)

(56) References Cited

U.S. PATENT DOCUMENTS 9,436,546 B2    9/2016 Marshall et al.
2015/0149857 A1*   5/2015 Motwani ............... H03M 13/05
714/763
(Continued)

OTHER PUBLICATIONS

TEC-IT, "Data Matrix (ECC200)—2D Barcode," http://www.tec-it.com/en/support/knowbase/symbologies/datamatrix/Default.aspx, 3 pages.
(Continued)

*Primary Examiner* — Samson B Lemma

(57) ABSTRACT

A system on a chip (SoC) and method of operation are described. A data processor has a processor data word size of pxoctets and is configured to handle data items having a data item size which is a non-integer multiple of the processor data word size. A memory controller is configured to write or read data items to a memory as multiples of mxoctets. Data can be sent between the data processor and the memory controller on a bus. A data protection code generator is configured to generate a data protection code for a data item generated by the data processor before transmitting the data item and the data protection code over the bus to the memory controller which writes at least one octet including at least a portion of the data item and at least a portion of the data protection code to an address. A data protection code checker is configured to receive a read data protection code and a read data item and to check the read data item for an error using the read data protection code. The memory controller reads at least one octet including at least a portion of the read data item and at least a portion of the read data protection code from a read address.

15 Claims, 9 Drawing Sheets

(51) Int. Cl.
*G06F 11/08* (2006.01)
*G06F 13/16* (2006.01)
*G06F 11/07* (2006.01)
*G06F 11/10* (2006.01)

(52) U.S. Cl.
CPC .......... *G06F 11/08* (2013.01); *G06F 11/1048* (2013.01); *G06F 11/1052* (2013.01); *G06F 13/1668* (2013.01)

(58) Field of Classification Search
USPC ....................................................... 713/189
See application file for complete search history.

(56) References Cited

U.S. PATENT DOCUMENTS

| | | | | |
|---|---|---|---|---|
| 2016/0054928 | A1* | 2/2016 | Chun | G06F 3/0607 711/2 |
| 2016/0080002 | A1* | 3/2016 | Ramaraju | H03M 13/353 714/764 |
| 2017/0177432 | A1 | 6/2017 | Fader et al. | |

OTHER PUBLICATIONS

Yoon et al., "Virtualized and Flexible ECC for Main Memory," Proceedings of ASPLOS, 2010, Department Electrical and Computer Engineering, The University of Texas at Austin, https://lph.ece.utexas.edu/users/dhyoon/pubs/virtualized_ecc_asplos10_slides.pdf, 26 pages.

* cited by examiner

MEMORY MANAGEMENT

The present specification relates to memory management and in particular to data protection code handling for a system on a chip (SoC).

A system on a chip or system on chip, generally referred to as an SoC or SOC, is an integrated circuit in which various components of an electronic system are integrated into a single chip. They are commonly used in mobile electronics applications owing to their relatively lower power consumption. They may typically include one or more processors, memory, a bus and interfaces to allow various peripherals and other devices and integrated circuits to interact with them. In some applications external memory may be used with an SoC, such as external random access memory (RAM), including dynamic random access memory (DRAM).

Data protection codes, such as Error Correction Codes (ECC) and parity bits, are a way of checking for errors in data that has been stored in memory and in particular in DRAM. Some ECC schemes also permit for correction of errors in stored data.

Detecting and correcting faults in data can be particularly important when safety is an issue and data protection codes are generally a common method of increasing the safety of electronic systems. In an SoC, masters, such as central processing units (CPUs), graphical processing units (GPUs), digital signal processors, etc., generate and consume data which is transported via interconnects on the chip to memories, such as system RAM or DRAM. The chip interconnect as well as the memories need to be protected to prevent data corruption, for example caused by cosmic radiation. The chip interconnect or memory controller might give a point solution for protection of the data by data protection codes.

However, implementing data protection code systems tends to lead to increased complexity. For example, a DRAM module may use extra memory bits and memory controllers that exploit those bits. In some instances, extra data lines or components may be required in order to implement an ECC memory system. However, these approaches may sacrifice some of the storage capacity of the memory and/or may increase the complexity of the bus and/or memory controller. If the memory controller and/or bus are provided as part of the SoC then that may also increase the complexity of the SoC and also increase the size of the bus and/or memory controller parts of the SoC.

Hence, it would be beneficial if data protection codes could be implemented in an SoC in a simple and efficient manner.

According to a first aspect of the present disclosure, there is provided a system on a chip, comprising: a data processor having a processor data word size of p×octets, wherein p is a positive integer, and configured to handle data items having a data item size which is a non-integer multiple of the processor data word size; a memory controller for a memory, wherein the memory controller is configured to write data to, or read data from, the memory as multiples of m×octets, wherein m is a positive integer; a bus over which data can be sent between the data processor and the memory controller; a data protection code generator configured to generate a data protection code for a data item generated by the data processor before transmitting the data item and the data protection code over the bus to the memory controller, and wherein the memory controller is further configured to write at least one octet including at least a portion of the data item and at least a portion of the data protection code to an address of the memory; and a data protection code checker configured to receive a read data protection code and a read data item received over the bus and to check the read data item for an error using the read data protection code, and wherein the memory controller is further configured to read at least one octet including at least a portion of the read data item and at least a portion of the read data protection code from a read address of the memory.

In one or more embodiments, the data protection code generator may be arranged between the data processor and the bus to receive data items generated by the data processor and pass data items and associated data protection codes to the bus for transmission to the memory controller.

In one or more embodiments, the data protection code checker may be arranged between the data processor and the bus to receive data items and associated data protection codes sent over the bus by the memory controller and to pass data items to the data processor.

In one or more embodiments, the data protection code generator and/or the data protection code checker may be provided as part of the data processor.

In one or more embodiments, the system on a chip may further comprise a further data processor having a further processor data word size of p'×octets, wherein p' is a positive integer, and configured to process data items having a data item size which is a non-integer multiple of the further processor data word size, wherein the data protection code checker is arranged between the further data processor and the bus to receive data items and associated data protection codes sent over the bus by the memory controller and to pass data items to the further data processor.

In one or more embodiments, the data protection code generator may be provided as part of the data processor and/or the data protection code checker may be provided as part of the further data processor.

In one or more embodiments, $m \geq 2$.

In one or more embodiments, p and/or p'≥2, and/or m may be in the range from 2 to 8, and/or the bus may have a width of b×octets, wherein b is a positive integer, and b may be in the range from 1 to 32.

In one or more embodiments, p=2, the data processor word may have, 2, 4 or 6 bits which are unused by the data item, m may be in the range from 2 to 8 and/or the bus may have a width of b×octets, wherein b is a positive integer, and b may be in the range from 1 to 32.

In one or more embodiments, the system on a chip may further comprise a central processing unit, which may have a central processing unit data word size and may be configured to handle data items having a data item size which is aligned with, or the same size as, the central processing unit data word size.

In one or more embodiments, the data protection code generator may be configured to generate a data protection code for a plurality of data items and/or to send one of the data items with the data protection code over the bus and/or the other of the plurality of data items separately from the data protection code over the bus.

In one or more embodiments, the data protection code generator may be configured to add the portion of the data item and the portion of the data protection code to an octet before transmission of the octet over the bus.

In one or more embodiments, the data protection code checker may be configured to receive the portion of the read data item and the portion of the read data protection code from an octet after transmission of the octet over the bus.

In one or more embodiments, the data protection code generator may be configured to cause the memory controller to store a further portion of the data item at a further address of the memory, and/or the data protection code checker may be configured to cause the memory controller to retrieve a further portion of the read data item from a further read address of the memory.

In one or more embodiments, the data protection code generator may be further configured to cause the memory controller to store a further portion of the data protection code at the further address of the memory, and/or the data protection code generator may be further configured to cause the memory controller to retrieve a further portion of the read data protection code from the further read address of the memory.

In one or more embodiments, the at least a portion of the data item may comprise the whole of the data item and/or the at least a portion of the read data item may comprise the whole of the read data item, and wherein the data protection code generator may be further configured to cause the memory controller to store the whole of the data item and the data protection code at the address of the memory, and/or the data protection code checker may be further configured to cause the memory controller to retrieve the whole of the read data item and the read data protection code from the read address of the memory.

In one or more embodiments, the data protection code may be an error correction code or an error detection code.

In one or more embodiments, the system on a chip may further include the memory in communication with the memory controller.

In one of more embodiments the memory may be an internal memory of the system on a chip.

In one of more embodiments the memory may be an external memory of the system on a chip.

According to a second aspect of the present disclosure, there is provided a package including a semi-conductor integrated circuit, wherein the semi-conductor integrated circuit is configured to provide the system on a chip of the first aspect.

According to a third aspect of the present disclosure, there is provided a data processing system comprising: the system on a chip of the first or the package of the second aspect; and a memory in communication with the memory controller.

In one or more embodiments, the memory may be a DRAM and the memory controller may be a DRAM controller.

According to a fourth aspect of the present disclosure, there is provided an electronic device including the system on a chip of the first aspect or the package of the second aspect or the data processing system of the third aspect. The electronic device may be an engine control unit, a camera, a radar, a lidar sensor unit, a sensor fusion data processor, a braking control unit, a steering control unit, a gateway processor, a network processor or similar.

According to a fifth aspect of the present disclosure, there is provided a method of operating a system on a chip comprising a data processor having a processor data word size of p×octets, wherein p is a positive integer, and configured to process data items having a data item size which is a non-integer multiple of the processor data word size, a memory controller for a memory with a plurality of memory addresses and wherein the memory controller is configured to write data to, or read data from, the memory as multiples of m×octets, wherein m is a positive integer, and a bus over which data items can be transmitted between the data processor and the memory controller, the method comprising: generating a data protection code for a data item generated by the data processor; transmitting the data protection code and the data item over the bus to the memory controller which writes at least one octet including at least a portion of the data item and at least a portion of the data protection code at an address in the memory; receiving over the bus a read data protection code and a read data item retrieved by the memory controller reading at least one octet including at least a portion of the read data protection code and at least a portion of the read data item from a read address in the memory; and checking the read data item for an error using the read data protection code.

Features of the first aspect may also be counterpart features for the fifth aspect.

Example embodiments of the invention will now be described in detail, by way of example only, and with reference to the accompanying drawings, in which.

Similar items in the different Figures share like reference signs unless indicated otherwise.

Figure 1:
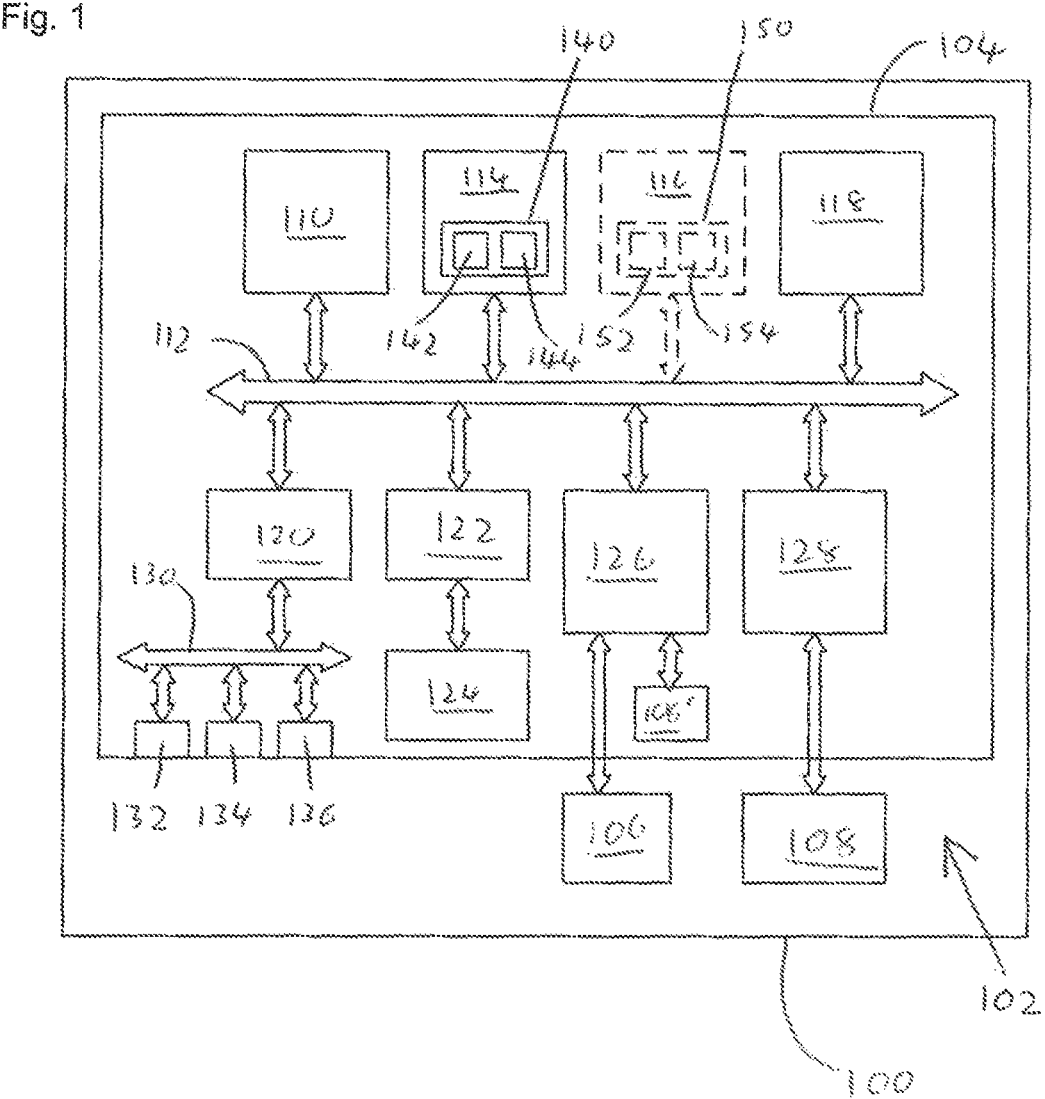
FIG. 1 shows a schematic block diagram of a first example system on a chip including data protection code handling.

With reference to FIG. 1 there is shown a schematic block diagram of a first example electronic apparatus or device 100 including a data processing system 102 comprising a system on a chip (SOC) 104 and a first storage device 106 and optionally a second storage device 108. The data processing system 102 may be used in a wide variety of electronic devices and apparatus and is particularly suited to applications with safety considerations in which faults in stored data may be identified and optionally corrected. For example, the electronic device 100 may be an engine control unit (ECU) for an engine of a vehicle, such as automobile. However, the SOC is not limited to use in engine control units and may also be used in cameras, radar, lidar sensor units, sensor fusion data processors, braking control units, steering control units, gateway processors, network processors or similar.

The SOC 104 illustrated in FIG. 1 is by way of example only. Various modifications and changes to the SOC illustrated in FIG. 1 would be apparent to a person of ordinary skill in the art. Also, various features typically provided in the SOC are omitted from FIG. 1 simply for clarity of explanation purposes.

First example SOC 104 includes a central processing unit 110 in communication with a bus or interconnect 112. The central processing unit may have a data word size which is aligned with the size of the data items that it handles. For example it may be a 16 bit processor handling 16 bit data items or a 32 bit processor handling 32 bit data items. SOC 104 also includes an auxiliary data processor 114, such as a graphical processing unit or image data processor. Optionally, a further auxiliary data processor 116, also in the form of a graphical processing unit may be provided, in other embodiments. As discussed in greater detail below, data processors 114 and 116, may have a data word size which is not the same as the size of the data items that they handle. For example they may be 16 bit processors handling 12 bit data items. Each of CPU 110, GPU 114 and optionally GPU 116 are a "master" data processing device in communication with bus 112 to generate data read or write requests to on-board or external storage devices.

The SOC 104 may also include a display controller 118, an I/O bridge 120, an on-board RAM controller 122, an on-board RAM 124, a DRAM controller 126 and non-volatile memory controller 128. DRAM controller 126 is in communication with off board DRAM 106. Additionally or alternatively, DRAM controller may also be in communication with on board or internal DRAM 106' of the SoC. Non-volatile memory controller 128 is in communication with off board non-volatile memory 108. I/O bridge 120 is in communication with an I/O interconnect 130 which in turn is in connection with various I/O interfaces, such as a controller area network (CAN) interface 132, serial peripheral interface (SPI) 134, an inter-integrated circuit (I2C) interface 136. One or more of these interfaces may be used by SOC 104 to interact with various other elements of the data processing system 102 and/or electronic device 100.

In this first example SOC 104, master processor 114 includes circuitry 140 to enable a data protection code memory functionality for the SOC 104 and DRAM 106 and/or DRAM 106'. The data protection code memory circuitry 140 includes a data protection code generator 142 and also a data protection code checker 144. In one embodiment, data protection code generator 142 and checker 144 are configured to generate and check parity bits associated with data write and read transactions. In another embodiment data protection code generator 142 and checker 144 are configured to generate and check error correction codes (ECCs) associated with data write and read transactions. Generator 142 and checker 144, when configured for ECC generation and ECC checking, are described in greater detail below with reference to FIGS. 5 and 6 respectively.

As illustrated in FIG. 1, if a further master processor 116 is also optionally provided, then second master processor 116 may also include its own data protection code memory circuitry 150 also including a data protection code generator 152 and data protection code checker 154. Hence, in the example system shown in FIG. 1, each of the one or more master processors includes a parity or ECC generator and a parity or ECC checker and so a data protection code memory system is implemented for each master processor independently of the other.

Figure 2:
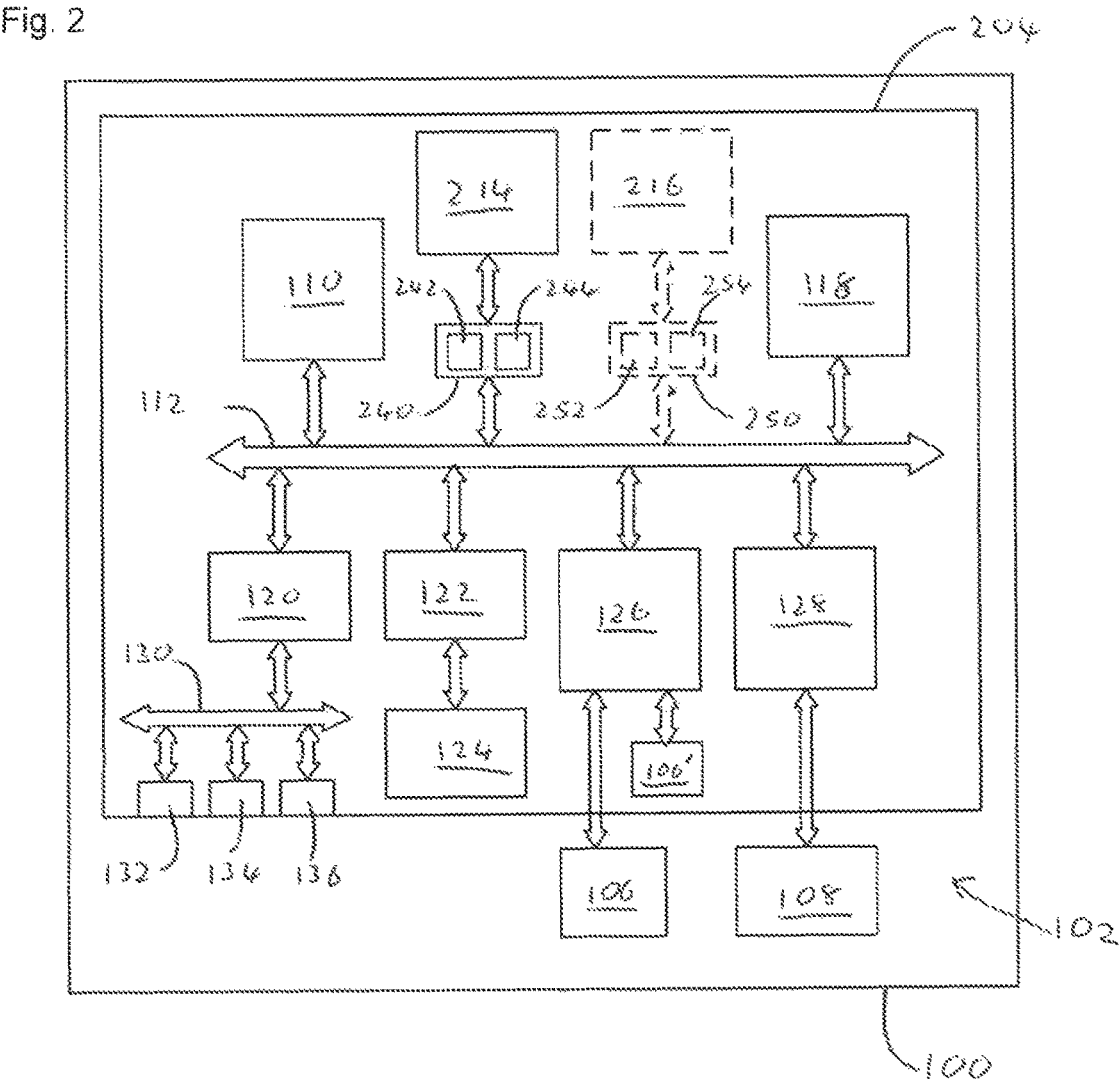
FIG. 2 shows a schematic block diagram of a second example system on a chip including data protection code handling.

FIG. 2 shows a second example SOC 204 similar to the first example SOC 104 shown in FIG. 1. The components of the SOC 204 are generally similar. However, in the second example SOC 204 the data protection memory circuitry 240, 250 is not provided on the master processor 214, 216, but rather separately to each master processor and between each respective master processor and the bus or interconnect 112. Hence, as illustrated in FIG. 2, first master processor 214 includes a first data protection memory circuit 240 including a parity or ECC generator 242 and a parity or ECC checker 244. Optionally, second master processor 216 has its own associated data protection memory circuitry 250 including a parity or ECC generator 252 and parity or ECC checker 254. Hence, a data protection code memory system is implemented for each master processor independently of the other.

Figure 3:
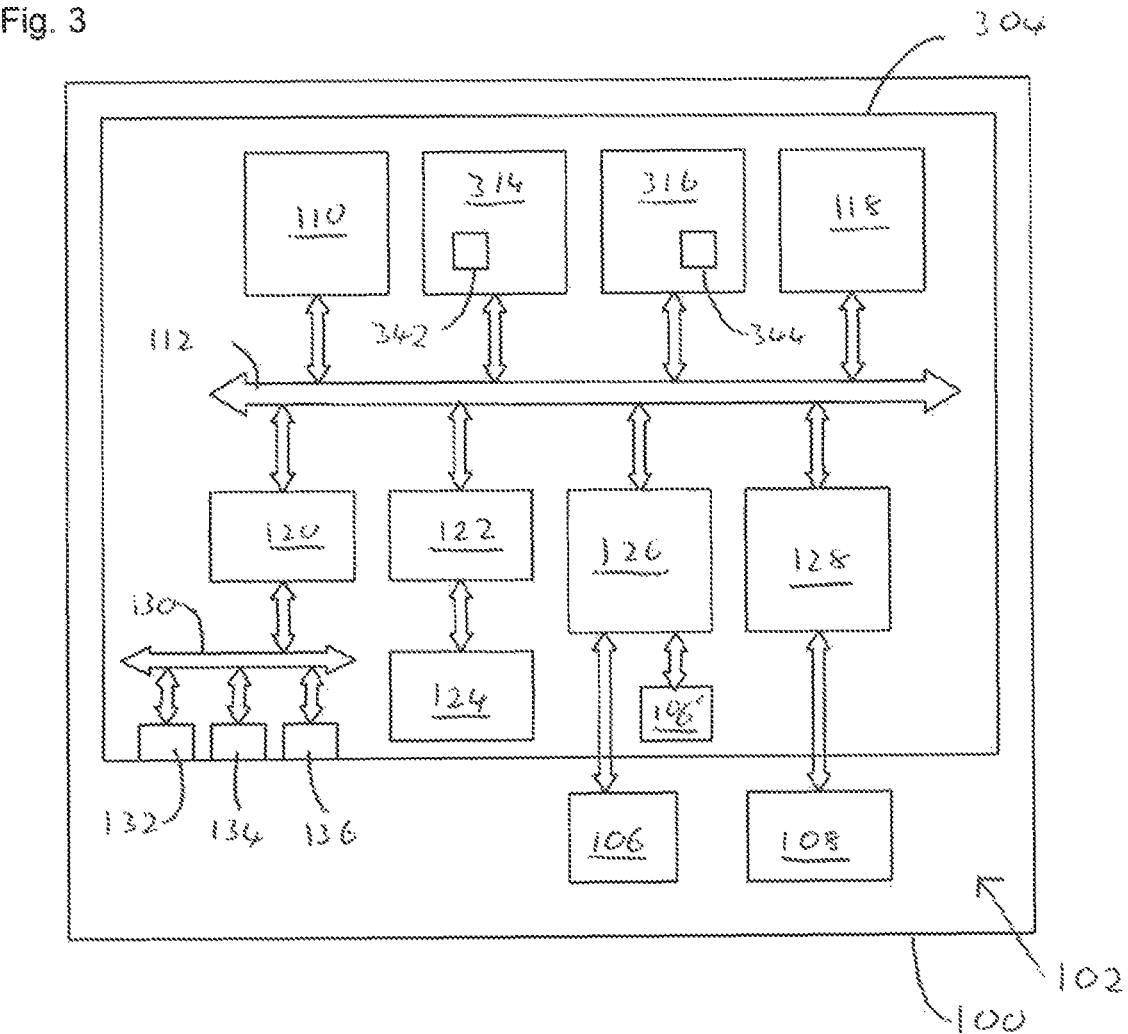
FIG. 3 shows a schematic block diagram of a third example system on a chip including data protection code handling.

With reference to FIG. 3, there is shown a third example SOC 304 as part of a data processing system 102 within electronic device 100. Third SOC 304 is similar to the first and second SOCs, 104, 204. However, in the third SOC 304, a first master processor 314 and a second master processor 316 are both provided. The first master processor 314 includes a parity or ECC generator 342 and the second master processor 316 includes a parity or ECC checker 344. In this third example SOC 304, first master processor 314 carries out write operations to DRAM 106 and/or DRAM 106' and therefore includes a parity or ECC generator 342. Second master processor 316 carries out read operations on DRAM 106 and/or DRAM 106' and therefore includes a parity or ECC checker 344. Hence, a data protection code memory system is implemented for the master processors, but with one master processor handling data storage and the other data retrieval.

Figure 4:
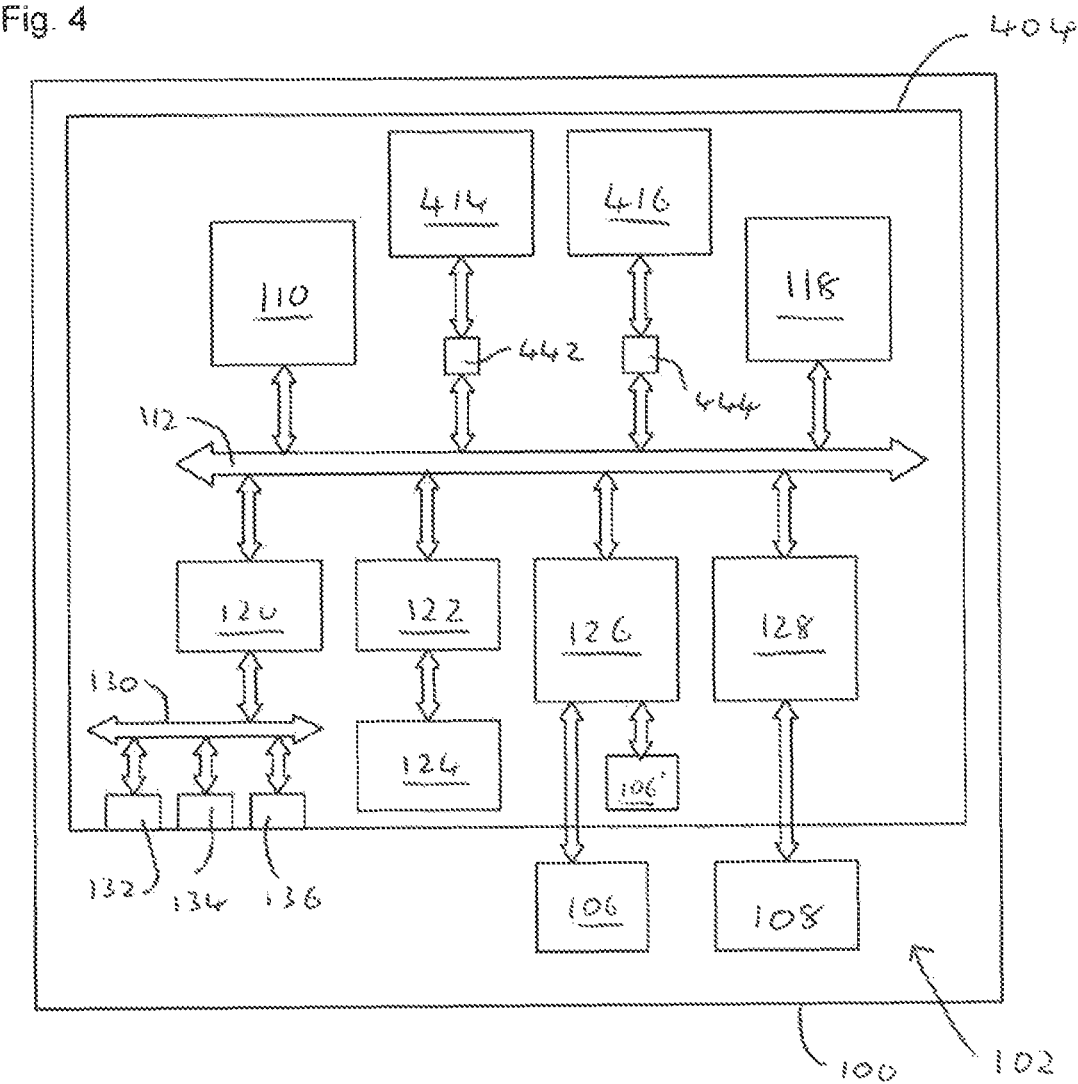
FIG. 4 shows a schematic block diagram of a fourth example system on a chip including data protection code handling.

FIG. 4 shows a fourth example SOC 404 similar to SOC 304. However, in the fourth example SOC 404, a parity or ECC generator 442 is provided between first master processor 414 and bus 112. A parity or ECC checker 444 is provided between the bus 112 and second master processor 416. In the fourth example SOC 404, first master processor 414 makes write requests to DRAM 106 and/or DRAM 106' and passes those via parity or ECC generator 442, second master processor 416 makes read requests of DRAM 106 and/or DRAM 106' and receives those via parity or ECC checker 444 between the bus 112 and second master processor 416. Hence, a data protection code memory system is implemented for the master processors, but with one master processor handling data storage and the other data retrieval.

It will be appreciated that the master processor, data protection code generator and data protection code checker arrangements illustrated in FIGS. 1 to 4 can also be combined and/or substituted in various ways, depending on the data read and write operations that the various master processors present in the SoC need to perform for any particular application of the SoC.

The data protection code memory systems shown in FIGS. 1 to 4 implement an end-to-end system in which the data protection code (ECC or parity) is added close to the initiation of the transaction and then travels with the transaction for storage either on external memory device 106 or on internal memory 106'. Similarly, when the data is read again, the data protection code is retrieved with the data from storage and travels with the data to a point close to the consumption of the data. Hence, in this approach the data protection code is not generated or checked en-route nor at the storage device, but rather at the master processor or before being transmitted over the bus. In the following the description will generally refer to the external memory device 106, but it will be appreciated that, unless the context requires otherwise, the description also applies to the internal memory 106' of the SoC.

Figure 5:
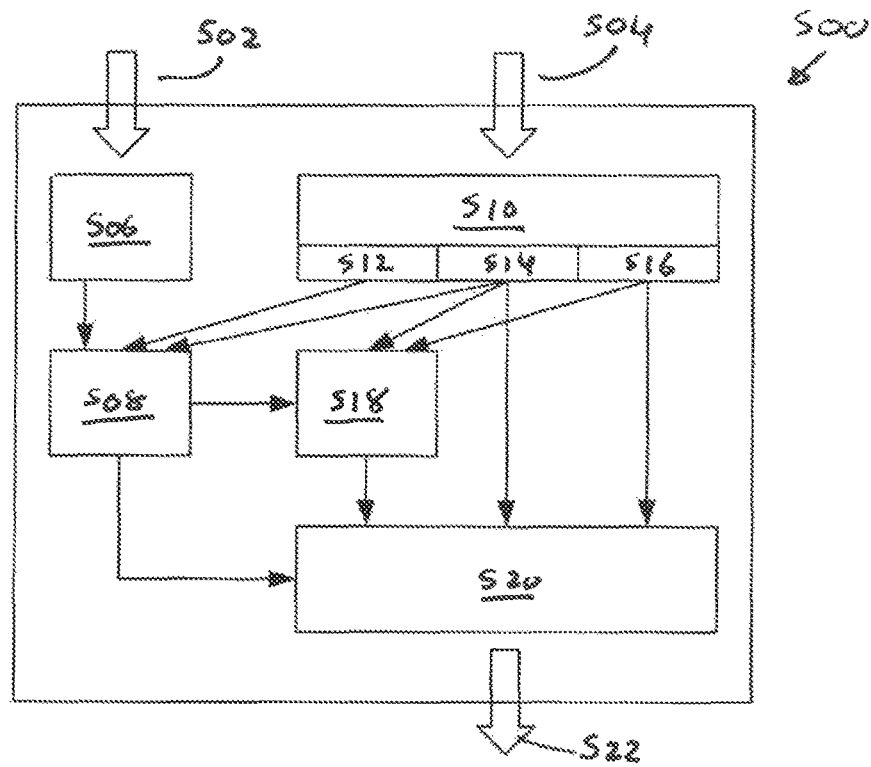
FIG. 5 shows a schematic block diagram of an ECC generator which may be used in the systems shown in FIGS. 1 to 4.

FIG. 5 shows a schematic block diagram of an ECC generator 500, corresponding generally to data protection code generators 142, 152, 242, 252, 342 and 442 of FIGS. 1 to 4 when configured to provide an ECC memory system. ECC generator 500 can receive a configuration request 502 which is passed to an ECC generator configuration interface 506 in communication with a mode controller 508. A configuration request 502 can configure various operational functions of the ECC generator as described in greater detail below. Mode controller 508 controls the overall mode of operation of the ECC generator 500 based on its current configuration as set by configuration request 502.

The ECC generator can also receive a write request transactions 504 from a master processor requesting one or more data items from the master processor to be written to DRAM 106 or DRAM 106'. The write request transaction 504 is passed to a transaction interface 510. ECC generator 500 also includes an ECC encoder 518 and a write transaction builder 520. Write transaction builder 520 outputs a write transaction to bus 112 for passing to DRAM controller 126 for storage of the data item and any associated ECC data in DRAM 106 or DRAM 106'

Transaction interface 510 is configured to extract the data item from the write request 504 and pass the data item 516 to the ECC encoder or alternatively directly to transaction builder 520. Transaction interface 510 is also configured to extract and pass the write address 514 for the write transaction 504 to the transaction builder 520, optionally to the ECC encoder 518 and also to the mode controller 508. Transaction interface 510 is also configured to extract various properties 512 and pass the write properties 512 to mode controller 508. The properties 512 extracted from the write request may include one or more of: the size of the transaction (e.g. the total number of bits to be written by the transaction); whether strobe bytes are being used; an identifier for the master processor that initiated the transaction; and any side band signals specifying any specific instructions being sent to the ECC generator by the initiating master processor. Which data items are passed by transaction interface 510 to the mode controller ECC encoder 518 and transaction builder 520 depends on the currently configured mode of operation of the ECC generator 500 as set by the current configuration values. The operation of ECC generator 500 is described in greater detail below.

Figure 6:
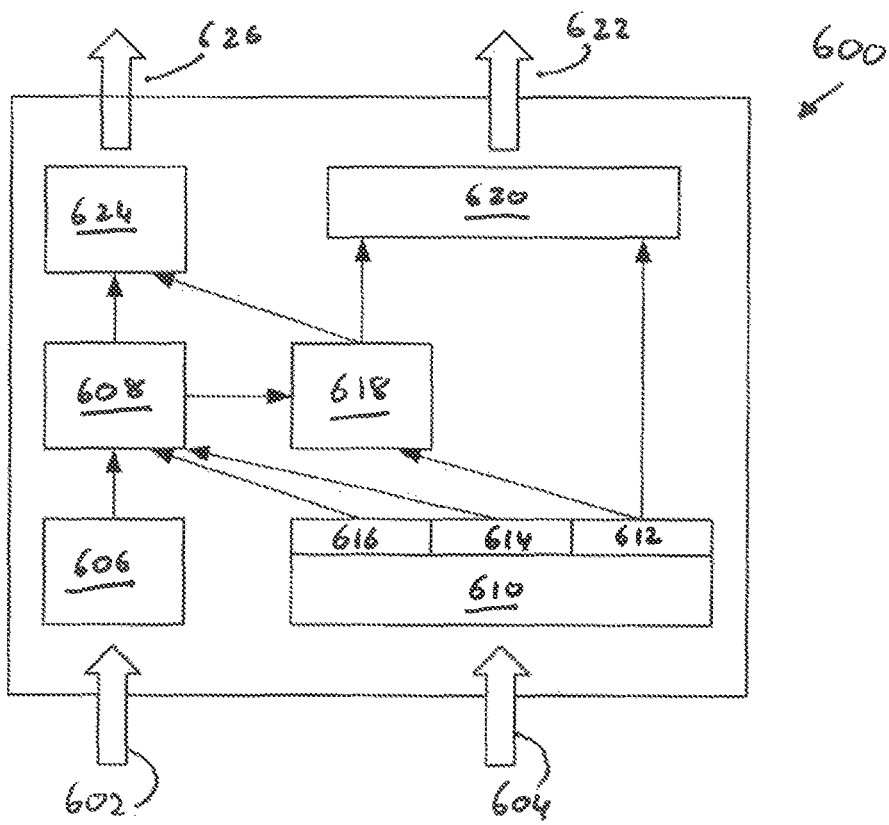
FIG. 6 shows a schematic block diagram of an ECC checker which may be used in the systems shown in FIGS. 1 to 4.

FIG. 6 shows a schematic block diagram of an ECC checker 600 corresponding generally to ECC checkers 144, 154, 244, 254, 344 and 444 of FIGS. 1 to 4. ECC checker 600 receives a configuration request 602 and also a read transaction request 604 over bus 112 from DRAM controller 126. Similarly to ECC generator 500, ECC checker 600 includes a configuration interface 606 in communication with a mode controller 608 via which a configuration request 602 can be used to configure the current mode of operation of the ECC checker 600.

A transaction interface 610 receives a read transaction request 604 from DRAM controller 126 over bus 112. Transaction interface 610 is configured to extract a data item 612, storage address 614 and various properties 616 from the received read transaction 604. The properties 616 extracted are similar to the properties 512 extracted by the ECC generator transaction interface 510. The read data item 612 can be passed directly to transaction builder 620 or alternatively to ECC decoder 618. The transaction interface 610 is also configured to extract the storage address 614 and pass the storage address to mode controller 608. The transaction interface 610 is also configured to extract various properties from the read transaction 604 and pass those data items to mode controller 608. The output from ECC decoder 618 is passed to transaction builder 620 and also to error reporting unit 624. Transaction builder 620 builds a read transaction 622 which is passed to the master processor that initiated the read request. Error reporting unit 624 is configured to generate and output an error signal 626 to the initiating master processor, or to a central error collection unit or as an interrupt to the CPU, when any ECC decoding error is detected by ECC decoder 618. Mode controller 608 is configured to selectively enable and/or disable error reporting unit 624 and ECC decoder 618. The operation of ECC checker 600 is described in greater detail below.

Generally, all the addressing and handling of data words may happen as multiples of 8-bits, or octets, in the data processor or processors, bus system, memory controller and memory. Multiples of 8-bits simplifies addressing and data word handling using standard approaches. This standardization across systems gives rise to unused bits. For the example of a 12-bit data item used to describe a pixel component, the next usable multiple of 8-bits is 16-bits. For a 16-bit bus system, the bus system may compose transfers of multiple 16-bit words as typically data is transported over the bus system in bursts of transfers of multiple 16-bit words.

Similarly, the memory word size of storage device 106 or 106' may also be a multiple of 8-bits and the memory controller 126 adapts the physical transmission over the bus system accordingly. For example, if a DRAM has an 8-bit word size, then a 16-bit bus could transfer two 8-bit memory words at a double data rate. Taking Low Power Double data Rate 4 (LPDDR4) as another example (and other DRAM types operate similarly), the memory word size can be 16-bit or 32-bit. A 32-bit memory word size simply corresponds to two 16-bit data structures which are transmitted in parallel and the memory controller is configured to carry out the appropriate translation.

Continuing with the example of pixel data being handled by the master processors, and the master processors having a 16 bit word length, typical data formats for pixel data are 8-bit, 10-bit or 12-bit which are then packed into a data word of 16-bit. Hence, the processor word size (e.g., 16 bits=2× octets) may be a non-integer multiple of the pixel data size (e.g., 12 bits=1.5×octets). The bus system may have a physical size of 16-bit, 32-bit, 64-bit, 128-bit or 256-bit. The memory controller itself may support 8-bit, 16-bit, 32-bit or even 64-bit wide memory transfers using one or multiple DRAM components.

Figure 7:
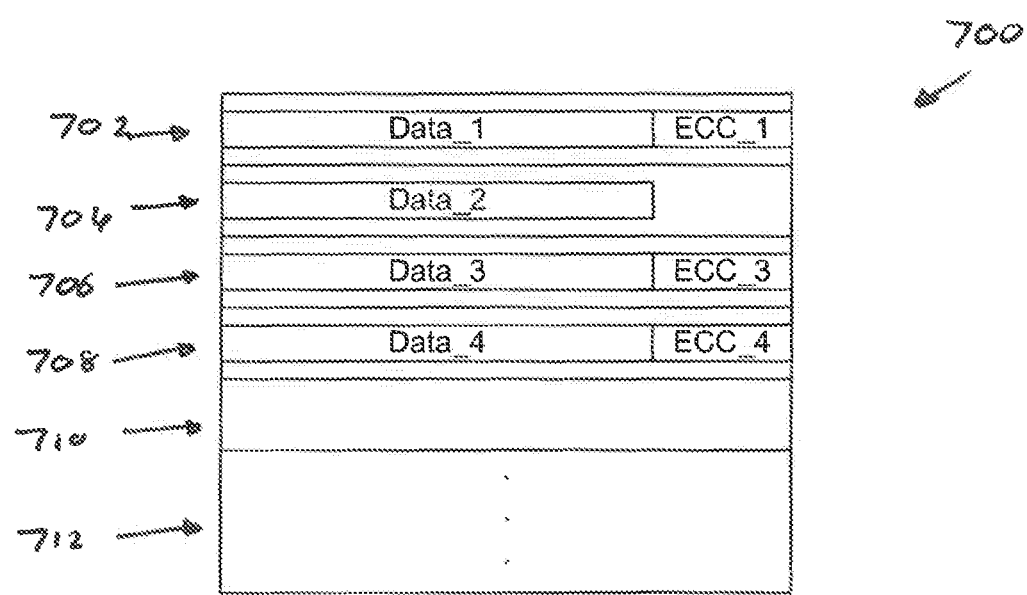
FIG. 7 shows a schematic graphical representation of a memory storing various data items and associated ECCs.

With reference to FIG. 7, there is shown a graphical representation of the structure 700 of DRAM 106 and/or DRAM 106'. As schematically illustrated in FIG. 7, DRAM 106 and/or 106' includes a plurality of addressable memory locations. Each memory location has a memory word size of, for example, 16-bits. It will be appreciated from the above that 16-bits is used merely for clarity of explanation, and that other memory word sizes can be used, e.g. 8, 24, 32 or 64-bits, depending on the implementation. FIG. 7 shows four memory locations 702 to 708 which store data and an empty memory address 710 illustrating the 16-bit memory word length. As will be appreciated, in practice, DRAM 106 and/or 106' has many more addressable locations than those illustrated in FIG. 7, as indicated by the ellipsis representing multiple locations 712.

As illustrated in FIG. 7, a first data item, DATA_1, is stored in a first memory location 702 together with its associated error correction code, ECC_1. The data item, DATA_1, has a data word length of 12-bits and the associated error correction code ECC_1, has a length of 4-bits. Hence, the first address 702 stores a 12-bit data item together with its associated ECC. As further illustrated in FIG. 7, a second address 704 stores only the data item, DATA_2 and no associated ECC, as error checking may not be needed for this type of data. As illustrated in FIG. 7, as the data word length is 12-bits, 4-bits of memory location 704 are empty. As further illustrated in FIG. 7, a third data item, DATA_3, and its associated error correction code, ECC_3, can be stored in a third memory address 706. A fourth data item, DATA_4, may be stored in a fourth address 708, together with its associated error correction code, ECC_4. The third and fourth memory locations, 706, 708, may be used to store either two 12-bit data items, or a single data item of 24-bits length by splitting the single data item into a first 12-bit portion, DATA_3 and a second 12-bit portion, DATA_4, and splitting an associated error correction code of 8-bits length into a first part of the error correction code of 4-bits length, ECC_3, and a second part of the error correction code also of 4-bits length, ECC_4.

In one embodiment, the data items may be a 12-bit pixel data item as handled by the or each master processor when the or each master processor has a 16-bit data word length. Hence, the extra 4-bits of the memory data word length can be used to store an ECC associated with the data item in an efficient manner In other embodiments, a one of the otherwise unused 4 bits of the memory addresses may be used to store a parity bit associated with the data item in embodiments in which the data protection code is a parity bit rather than an ECC.

However, it will be appreciate that the invention is not limited to the storage of pixel data items. Rather, the approach can be used for any data items which can be stored at a single memory address, or split between multiple memory addresses, so that otherwise unused bits of at least one of the memory addresses can be used to store data protection code bits associated with the stored data item. The processes for writing data to and reading data from data structure 700 of DRAM 106 or 106' will now be described in greater detail with reference to FIG. 8.

Figure 8:
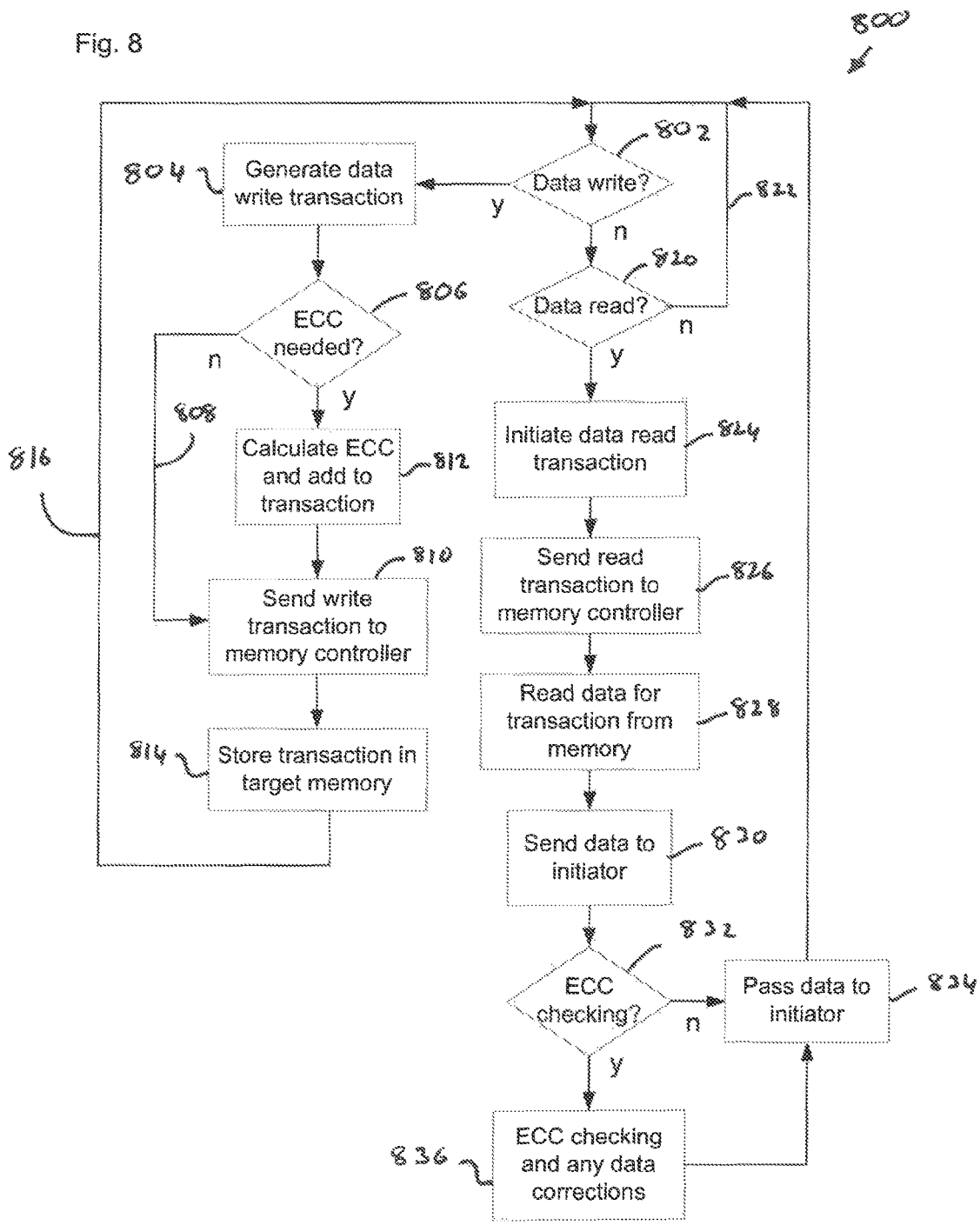
FIG. 8 shows a process flow chart illustrating a method of operation of an ECC memory system.

With reference to FIG. 8 there is shown a process flow chart illustrating a general method of operation of the SOC 800. Processing begins at 802 when it is determined by a master processor that a data write operation to DRAM 106 or 106' is to be carried out. Alternatively, if a data write operation is not to be carried out, then a master processor determines whether a data read operation is to be carried out from DRAM 106 or 106'. If not, then processing can return, as illustrated by process flow line 822 until either a data write or data read operation is initiated by a master processor.

If a data write operation is initiated then processing proceeds to 804 at which master processor initiates a data write transaction 504 which is passed to the transaction interface 510 of the ECC generator. At 806, the ECC generator determines whether an ECC is to be generated for the current write transaction. If not, then processing proceeds, as illustrated by process flow line 808 to 810. The transaction builder 520 builds a write transaction 522 from the current address 514 and data item, e.g. a 12 bit pixel data item 516. At 810, the write transaction 522 is sent over the bus 112 to the DRAM controller 126. At 814, the DRAM controller 126 stores the current data item in the target memory device, DRAM 106 or 106'. Processing can then return, as illustrated by process flow line 816 to determine when a next data write request or data read request is initiated.

Figure 9:
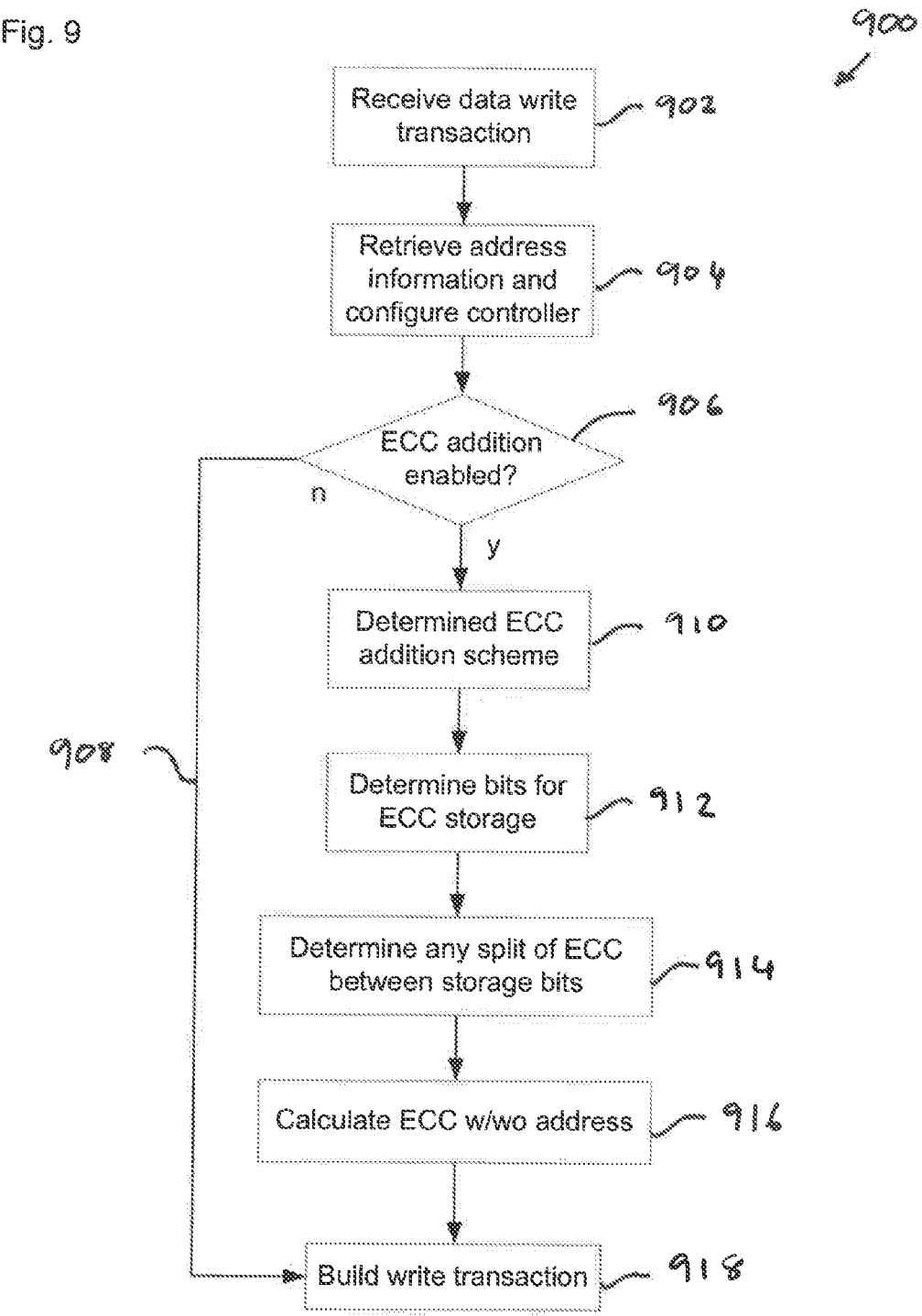
FIG. 9 shows a process flow chart illustrating a method of operation of the ECC generator shown in FIG. 5.

FIG. 9 illustrates operation of the ECC generator 500 in greater detail and corresponds generally to steps 806, 808, 810 and 812 of FIG. 8.

The process flow chart in FIG. 9 illustrates the method of operation 900 of the ECC generator 500 in greater detail. At step 902, the ECC generator 500 receives the data write transaction 504 from the initiating master processor. At 904, the transaction interface retrieves the address and properties information and passes the address and property information to mode controller 508. Based on the addressing information and properties information, mode controller 508 determines the configuration of the ECC generator for that address. At 906, the mode controller 508 determines whether ECC addition has been enabled for the current write address. If not, then processing proceeds as indicated by process flow line 908 to step 918. At 918, the transaction builder 520 receives the address information 514 and current 12 bit pixel data item 516 and builds a write transaction. The write transaction 522 is then output to the bus for transmission to the memory controller.

In some embodiments, the ECC generator may generate a data protection code for a plurality of data items. The data protection code can be sent over the bus with a one of the data items and the rest of the data items can be sent over the bus separately to their associated data protection code.

Returning to 906, if the mode controller determines that ECC addition is enabled for the current memory address then processing proceeds to 910. At 910, the mode controller determines what ECC addition scheme is required for the current address. The ECC generator may be able to implement various different ECC addition schemes. For example, a 8, 10, or 12-bit data word may be used with a corresponding 8, 6 or 4 bit ECC. The ECC may be formed with or without the memory address. The ECC may be calculated for one or a plurality of data words. For example, the ECC may be calculated for one 12 bit data word or for two 8 bit data words (originating from an original 16 bit data item). The ECC may be stored in the unused bits of one or a plurality of memory addresses. Once the ECC addition scheme has been determined, at 912, the mode controller, with reference to configuration information, determines which bits of the current storage address are to be used for ECC storage. For example, as illustrated in FIG. 7, bits 13 to 16 of storage address 702 are used to store a 4 bit ECC.

At 914, the mode controller determines with reference to configuration data whether there is to be any split of ECC data between different storage bits. For example, if a 24 bit data word is being used with an 8 bit ECC, then the first 12 bits of the data word may be stored in the first 12 bits of memory address 706 and the second 12 bits of the data word in the first 12 bits of the second memory address 708. The 8 bit ECC may then be split into two 4 bit segments with a first 4 bit segment stored in the 13th to 16th bits of memory address 706 and the second 4 bits the ECC stored in the 13th to 16th bits of memory address 708.

The mode controller 508 then also determines, with reference to configuration data whether the ECC for the current data item is to be calculated with or without address information. Then at 916 the mode controller instructs the ECC encoder 518 to calculate an ECC, with or without the address data item 514, and pass the calculated ECC to transaction builder 520. Mode controller 508 can also pass other addressing information to transaction builder 520 to enable the determined ECC addition scheme, ECC bit storage location and any determination of splitting of ECC between storage bits. Transaction builder 520 then builds the appropriate write transaction 522 at 918 which is then passed to bus 112 for transmission to DRAM controller 126 and storage in DRAM 106 at the appropriate address or addresses.

If no ECC is generated for the data item, then the unused bits may be padded with zeros or the unused bits are simply left with their original values. Hence, if a 12 bit pixel data item is being transmitted over a 16 bit bus with no 4 bit ECC, then the four unused bits may be set to zero or retain the original values generated by the master processor.

Returning to FIG. 8, if at 820 it is determined that a data read request has been initiated by a master processor then at 824, a data read transaction is initiated by the master processor. A read transaction is sent over bus 112 to memory controller 126 at 826. At 828, the memory controller 126 reads the data from the current address from DRAM 106. At 830, the memory controller 126 sends the retrieved 16 bit data back to the initiating master processor at 830 over bus 112. At 832, it is determined whether ECC checking is required for the retrieved data. If not, then at 834, the retrieved data is passed to the initiating master processor. Processing then returns until a next read or write instruction is generated. If at 832 it is determined that ECC checking is to be carried out then at 836 the ECC checker checks the ECC associated with retrieved data item and optionally carries out any data corrections, if required.

Figure 10:
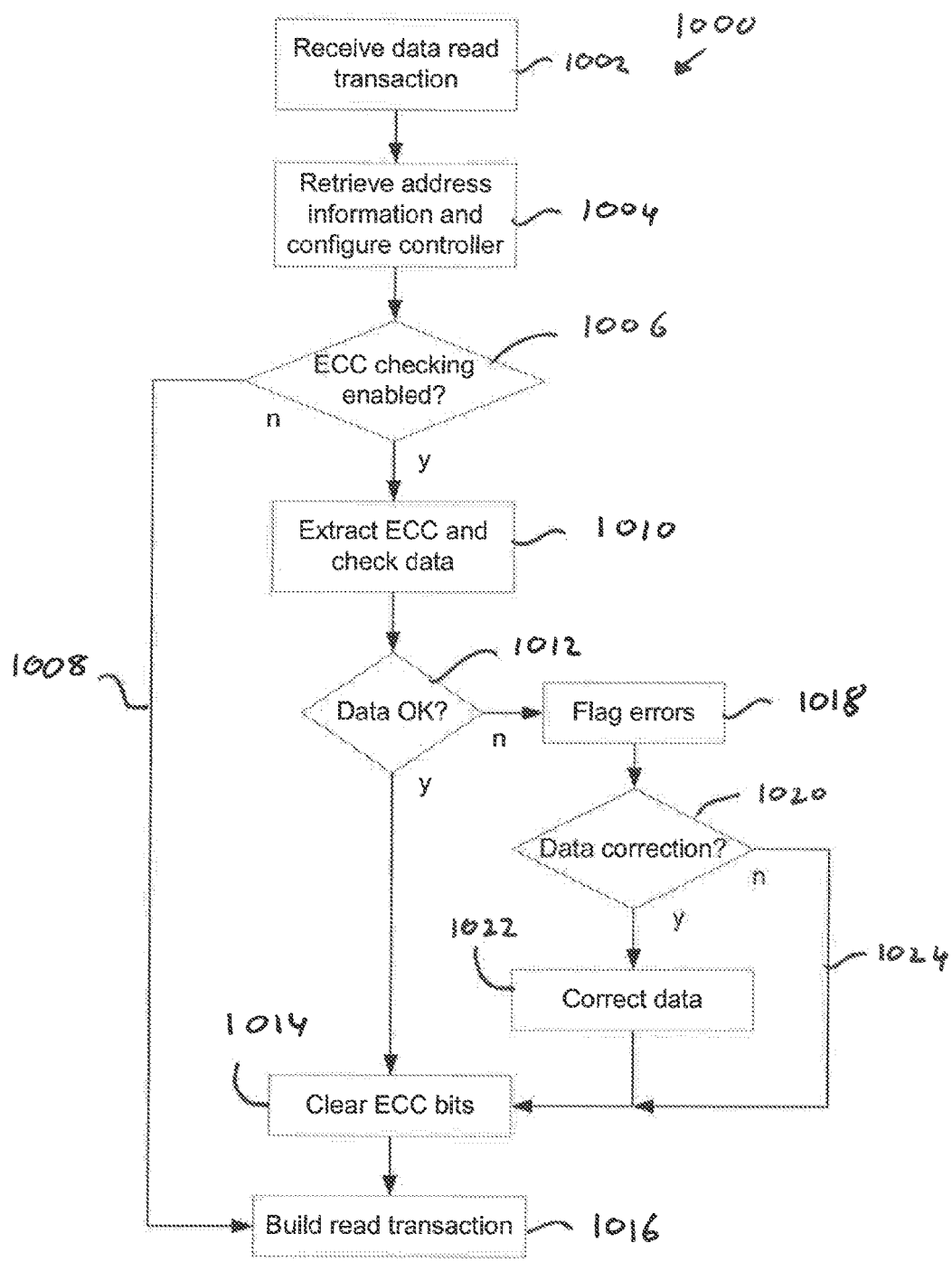
FIG. 10 shows a process flow chart illustrating a method of operation of the ECC checker shown in FIG. 6.

FIG. 10 shows a process flow chart illustrating a method of operation 1000 of the ECC checker 600 and corresponding generally to steps 832, 834 and 836 of FIG. 8.

At 1002, a data read transaction 604 is received by a transaction interface 610 over bus 112. The transaction interface 610 retrieves address information 614 and other properties associated with the data read transaction as described above and passes these to mode controller 608. Mode controller 608 configures the ECC checker based on configuration data stored in configuration interface 606. At 1006, mode controller 608 determines whether ECC checking is enabled for the address 614 associated with the current data item 612. If not, then processing proceeds along process flow line 1008. At 1016, the transaction builder 620 builds a read transaction from the current data item 612 and passes the read transaction 622 to the initiating master processor.

Alternatively, if it is determined at 1006 that ECC checking is enabled for the current data item then processing proceeds to 1010. At 1010, the ECC decoder 618 extracts the ECC from the current data and checks the 12 bit data word for any errors. The ECC decoder 618 determines whether the received data item has an error at 1012. If the received data item passes the ECC check at 1012 then the process proceeds to 1014 at which the ECC bits of the received data are optionally cleared. The 12 bit data word is then passed to the transaction builder 620 and a read transaction 622 is passed to the initiating master processor.

Returning to 1012, if the ECC check indicates that there is an error in the received data item, then processing proceeds to 1018 and the ECC decoder 618 notifies an error reporting unit 624 which outputs an error signal 626 flagging an error in the read data at 1018. At 1020, based on configuration data, the mode controller 608 determines at 1020 whether data correction of received data item is required or not. If not, then processing proceeds as illustrated by process flow line 1024 to 1014 at which optionally, the ECC bits can be cleared from the data item before passing to the read transaction builder 620.

Alternatively, if at 1020, it is determined that data correction is required, then processing proceeds to 1022. At 1022, ECC decoder 618 carries out a data correction process and passes the corrected data item to transaction builder 620 and, optionally, ECC bits are cleared at 1014 before building the read transaction 1016 and outputting the read transaction 622 to the initiating master processor.

Although an ECC based approach has been described in detail above, it will be apparent to a person of ordinary skill in the art how to adapt the general teaching above to a parity based system in which one or more parity bits are stored in unused bits of the DRAM associated with the corresponding data. As will be understood by a person of ordinary skill in the art, parity bits may be used to check for errors in data bit not to correct errors in data. Hence, the general method illustrated in FIG. 8 can also be carried out for a parity based system in which parity bits are used for the data protection code instead of an ECC.

Hence, in the presently described SOC and method of operation, unused bits of a storage device are used to store data protection code data. In this way, data protection code data can travel with the data items through the bus and memory system without any additional costs, e.g. in terms of bandwidth or die size.

Data protection solutions are particularly useful in applications with functional safety requirements. A data protection solution which also can be implemented with reduced costs, complexity and no reduction in performance, e.g. bandwidth, is beneficial.

For example, Low Powered Double Data Rate 4 (LPDDR4) is a high speed DRAM interface which may be used for consumer products and specifies a two channel die with 16 bits per channel giving a 32 bit system. Hence, the 16 bit channel can be used to transmit a 12 bit data word, e.g. a pixel data word, together with a 4 bit ECC. Hence, the approach described herein allows an ECC memory system to be realised without requiring modification of the bus or memory controller or DRAM device.

The approach adopted herein means that no additional data lines on the physical interface are required and which would require additional DRAM components. An alternative approach of inserting ECC data as part of the payload without changing the physical data lines reduces the effective bus bandwidth for the data items. If ECC were added in the DRAM controller then a separate mechanism would be needed in the bus system so that gaps may exist where data would not be protected. Using the end-to-end approach of the presently described system and method, no gap is present throughout the bus and memory system.

Hence, the system and method describe avoid the need for additional data lines requiring additional components or imposition of a bandwidth penalty that would arise if an ECC were generically inserted into the payload data.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Any instructions and/or flowchart steps can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

While the disclosure is amenable to various modifications and alternative forms, specifics thereof have been shown by way of example in the drawings and described in detail. It should be understood, however, that other embodiments, beyond the particular embodiments described, are possible as well. All modifications, equivalents, and alternative embodiments falling within the scope of the appended claims are covered as well.

The invention claimed is:

1. A system on a chip, comprising:
   a data processor having a processor data word size of pxoctets, wherein p is a positive integer, and configured to handle data items having a data item size which is a non-integer multiple of the processor data word size;

a memory controller for a memory, wherein the memory controller is configured to write data to, or read data from, the memory as multiples of m×, wherein m is a positive integer;

a bus over which data can be sent between the data processor and the memory controller;

a data protection code generator generate a data protection code for a data item generated by the data processor before transmitting the data item and the data protection code over the bus to the memory controller, and wherein the memory controller is further configured to write at least one octet including at least a portion of the data item and at least a portion of the data protection code to an address of the memory; and a data protection code checker receive a read data protection code and a read data item received over the bus and to check the read data item for an error using the read data protection code, and wherein the memory controller is further configured to read at least one octet including at least a portion of the read data item at least a portion of the read data protection code from a read address of the memory; wherein the data protection code generator is arranged between the data processor and the bus to receive data items generated by the data processor and pass data items and associated data protection codes to the bus for transmission to the memory controller and the data processor is implemented using circuitry.

2. The system on a chip as claimed in claim 1, wherein the data protection code checker is arranged between the data processor and the bus to receive data items and associated data protection codes sent over the bus by the memory controller and to pass data items to the data processor.

3. The system on a chip as claimed in claim 1, wherein the data protection code generator and/or the data protection code checker is provided as part of the data processor.

4. The system on a chip as claimed in claim 1, and further comprising a further data processor having a further processor data word size of p'×octets, wherein p' is a positive integer, and configured to process data items having a data item size which is a non-integer multiple of the further processor data word size, wherein the data protection code checker is arranged between the further data processor and the bus to receive data items and associated data protection codes sent over the bus by the memory controller and to pass data items to the further data processor.

5. The system on a chip as claimed in claim 4, wherein the data protection code generator is provided as part of the data processor and/or the data protection code checker is provided as part of the further data processor.

6. The system on a chip as claimed in claim 1, wherein m≥2.

7. The system on a chip as claimed in claim 1, wherein p and/or p'≥2, m is in the range from 2 to 8, and the bus has a width of b×octets, wherein b is a positive integer, and b is in the range from 1 to 32.

8. The system on a chip as claimed in claim 1, wherein the data protection code generator is configured to cause the memory controller to store a further portion of the data item at a further address of the memory, and/or the data protection code checker is configured to cause the memory controller to retrieve a further portion of the read data item from a further read address of the memory.

9. The system on a chip as claimed in claim 8, wherein the data protection code generator is further configured to cause the memory controller to store a further portion of the data protection code at the further address of the memory, and/or the data protection code checker is further configured to cause the memory controller to retrieve a further portion of the read data protection code from the further read address of the memory.

10. The system on a chip as claimed in claim 1, wherein the at least a portion of the data item comprises the whole of the data item and/or the at least a portion of the read data item comprises the whole of the read data item, and wherein the data protection code generator is further configured to cause the memory controller to store the whole of the data item and the data protection code at the address of the memory, and/or the data protection code checker is further configured to cause the memory controller to retrieve the whole of the read data item and the read data protection code from the read address of the memory.

11. The system on a chip as claimed in claim 1, wherein the data protection code is an error correction code or an error detection code.

12. The system on a chip as claimed in claim 1 and further comprising a memory in communication with the memory controller.

13. A data processing system comprising:
the system on a chip as claimed in claim 1; and
a memory in communication with the memory controller.

14. The system on a chip as claimed in claim 1 or the data processing system as claimed in claim 1, wherein the memory controller is a DRAM controller and the memory is a DRAM.

15. A method of operating a system on a chip comprising a data processor having a processor data word size of p×, wherein p is a positive integer, and process data items having a data item size which is a non-integer multiple of the processor data word size, a memory controller for a memory with a plurality of memory addresses and wherein the memory controller is configured to write data to, or read data from, the memory as multiples of m×octets, wherein m is a positive integer, and a bus over which data items can be transmitted between the data processor and the memory controller, the method comprising:

generating a data protection code, by a data protection code generator, for a data item generated by the data processor;

transmitting the data protection code and the data item over the bus to the memory controller which writes at least one octet including at least a portion of the data item and at least a portion of the data protection code at an address in the memory;

receiving over the bus a read data protection code and a read data item retrieved by the memory controller reading at least one octet including at least a portion of the read data protection code and at least a portion of the read data item from a read address in the memory; checking the read data item for an error using the read data protection code; wherein the data protection code generator is arranged between the data processor and the bus to receive data items generated by the data processor and pass data items and associated data protection codes to the bus for transmission to the memory controller and the data processor is implemented using circuitry.

* * * * *